United States Patent
Ravichandran

(10) Patent No.: US 10,250,745 B2
(45) Date of Patent: Apr. 2, 2019

(54) IDENTIFYING THE CELLULAR NUMBER ON A CELLULAR DEVICE CAPABLE OF SUPPORTING MULTIPLE CELLULAR NUMBERS

(71) Applicant: T-Mobile USA, Inc., Bellevue, WA (US)

(72) Inventor: Vinod Ravichandran, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/687,676

(22) Filed: Aug. 28, 2017

(65) Prior Publication Data

US 2019/0068778 A1 Feb. 28, 2019

(51) Int. Cl.
| | |
|---|---|
| *H04M 3/42* | (2006.01) |
| *H04M 1/272* | (2006.01) |
| *H04L 29/12* | (2006.01) |
| *H04B 1/3816* | (2015.01) |

(52) U.S. Cl.
CPC ........ *H04M 3/4228* (2013.01); *H04B 1/3816* (2013.01); *H04L 61/157* (2013.01); *H04L 61/1594* (2013.01); *H04M 1/272* (2013.01)

(58) Field of Classification Search
CPC . H04M 3/4228; H04M 1/272; H04L 61/1594; H04L 61/157; H04B 1/3816
See application file for complete search history.

(56) References Cited

U.S. PATENT DOCUMENTS

| | | | | |
|---|---|---|---|---|
| 7,929,955 | B1* | 4/2011 | Bonner | H04M 3/42068 455/414.1 |
| 8,478,309 | B1* | 7/2013 | Davis, III | H04L 67/306 370/353 |
| 9,215,683 | B1* | 12/2015 | Tonogai | H04W 60/005 |
| 9,467,542 | B1* | 10/2016 | Messenger | H04M 1/274533 |
| 9,882,865 | B1* | 1/2018 | Sipher | H04L 61/1547 |
| 2006/0234693 | A1* | 10/2006 | Isidore | H04M 1/72519 455/422.1 |
| 2007/0238472 | A1* | 10/2007 | Wanless | H04L 29/06027 455/461 |
| 2008/0280639 | A1 | 11/2008 | Alfia | |
| 2008/0318616 | A1* | 12/2008 | Chipalkatti | H04M 1/72572 455/550.1 |
| 2010/0081460 | A1* | 4/2010 | Knight | H04L 12/6418 455/461 |
| 2011/0098089 | A1 | 4/2011 | Irie et al. | |
| 2016/0381231 | A1* | 12/2016 | Messenger | H04M 1/274533 455/406 |
| 2017/0244832 | A1* | 8/2017 | Messenger | H04M 3/42059 |
| 2017/0245137 | A1 | 8/2017 | Cho et al. | |

FOREIGN PATENT DOCUMENTS

WO WO2016208929 12/2016

OTHER PUBLICATIONS

PCT Search Report and Written Opinion dated Dec. 5, 2018 for PCT Application No. PCT/US18/47681, 12 pages.

* cited by examiner

*Primary Examiner* — Nathan Mitchell
(74) *Attorney, Agent, or Firm* — Lee & Hayes, P.C.

(57) ABSTRACT

Technologies for displaying information about a number used to contact a cellular device is described herein. A customizable field in a contact is used to designate which number of plurality of numbers usable by the cellular device the originating device associated with the contact is using to connect to the cellular device.

20 Claims, 6 Drawing Sheets

IDENTIFYING THE CELLULAR NUMBER ON A CELLULAR DEVICE CAPABLE OF SUPPORTING MULTIPLE CELLULAR NUMBERS

BACKGROUND

The Internet Protocol Multimedia Subsystem ("IMS") is an architectural framework for delivering Internet Protocol ("IP") multimedia to mobile users, such as users of smart phones or tablet computers. An IMS core network ("IMS core") permits wireless and wireline devices to access multimedia, messaging, and voice applications and services. IMS standards and specifications have been promulgated by the 3rd Generation Partnership Project ("3GPP").

To allow the IMS core to be integrated with Internet resources, the 3GPP specifications use Internet Engineering Task Force protocols within the IMS core, such as Session Initiation Protocol ("SIP") and Diameter. SIP is a signaling protocol used for creating, modifying and terminating two-party or multiparty sessions consisting of one or several media streams. A mobile device registers its IP address with a SIP registrar server within an IMS core by generating and sending a SIP request message with a "REGISTER" method token. Once registered, a mobile device may subsequently establish multimedia sessions via the IMS core.

Some cellular phones are capable of allowing the user of the cellular phone to use multiple phone numbers. For example, some phones are capable of using multiple subscriber identity module (SIM) cards. A cellular phone with multiple SIM cards can receive and dial out from multiple phone lines as if the device were multiple devices. In other examples, some cellular networks or other entities provide applications (or "apps") that allow the user to utilize multiple phone numbers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
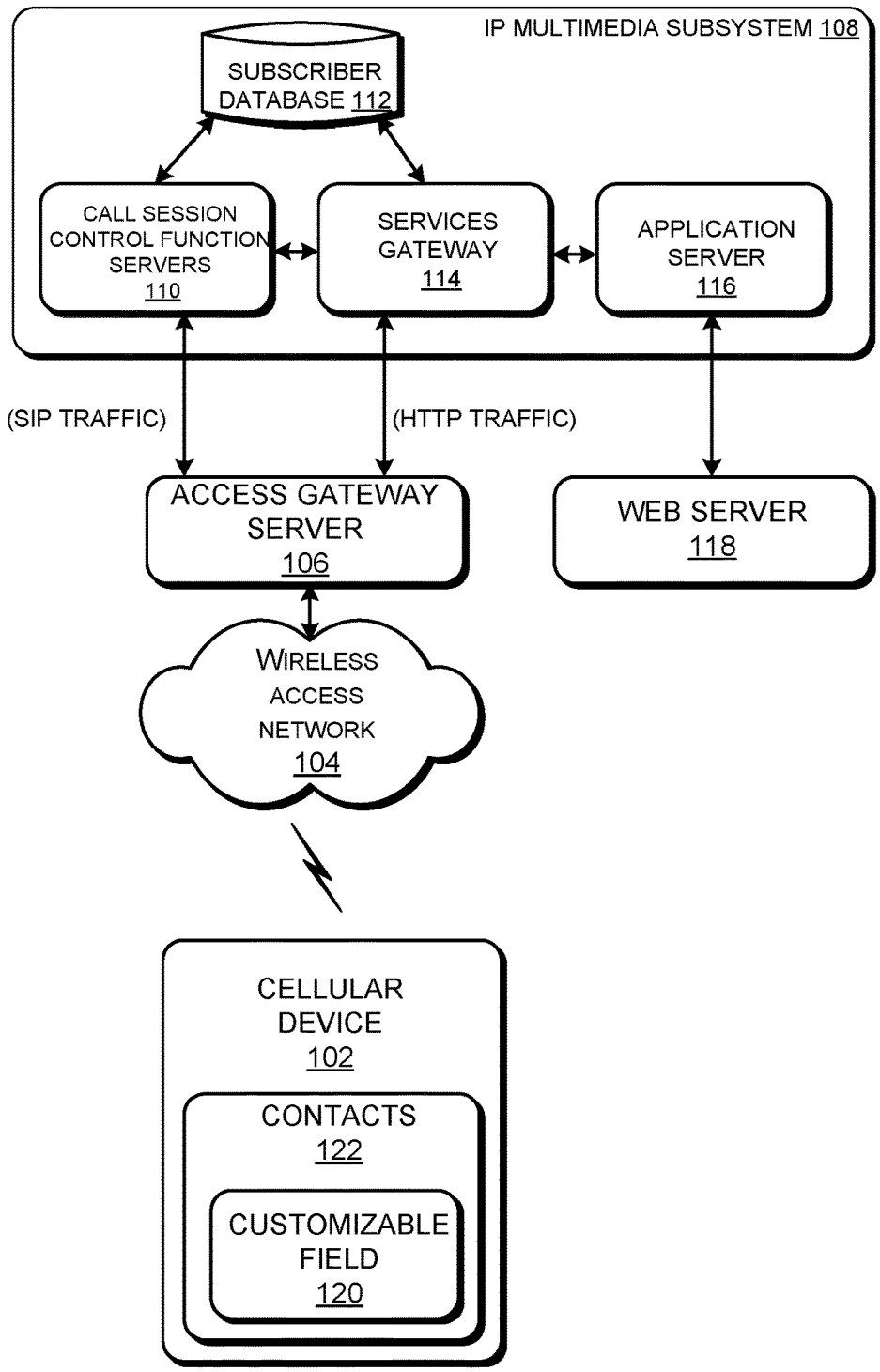
FIG. 1 illustrates an example environment.

Described herein are technologies for identifying the cellular number used on a mobile device capable of supporting multiple cellular numbers. In conventional systems, the address book is typically used to identify the type of device or origin of the incoming call (or the receiving device or number in the case of an outbound call). In a distinctly different manner, the address book of a cellular device is modified to identify the cellular number used by the incoming call, rather than the device used to make the call. In some examples, a field in the native address book used to generate the contact list is modified to identify the cellular number used. In some examples, a customizable field of the contact in the address book is modified by using a custom field identifier to associate the incoming call with one of multiple cellular numbers usable on the cellular device.

In some examples, the modification of a customizable field in an address book provides various technical advantages. In some instances, the use of cellular device bandwidth can be reduced. By identifying the number being used for the cellular device, the recipient can make a more informed decision as to whether or not to take a call. For example, the contact information for a particular individual can be set so that if the individual calls on one number, the information shown to the receiver upon receipt of the call indicates a personal call, and, the contact information for the individual can be set so that if the individual calls on another number, the information shown to the receiver upon receipt of the call indicates a business or emergency call.

Thus, even though the two calls likely come from the same device, the recipient may be able to determine that one should be connected while the other should not, thus potentially saving cellular bandwidth and computing resources. Further, the receiver may be able to manage their communications more efficiently. These and other technical advantages can be achieved using various configurations of the presently disclosed subject matter.

While the technical details are presented herein in the general context of program modules, those skilled in the art will recognize that the configurations can also be implemented in combination with other program modules. Generally, program modules include routines, programs, components, data structures, and other types of structures that perform particular tasks or implement particular abstract data types.

Moreover, those skilled in the art will appreciate that the configurations described herein can be practiced with various computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In the following detailed description, references are made to the accompanying drawings that form a part hereof, and in which are shown by way of illustration specific configurations or examples. Referring now to the drawings, aspects of the various implementations provided herein and an exemplary operating environment will be described.

FIG. 1 is a block diagram that illustrates a system 100 for identifying the cellular number used on a cellular device capable of supporting multiple cellular numbers. It should be understood that although FIG. 1 is described in the context of an IMS network, other networks may be used and are considered to be within the scope of the presently disclosed subject matter. A cellular device 102 is connected via a wireless access network 104 to an access gateway server 106.

The cellular device 102 can be of various types configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar cellular devices.

The cellular device 102 can be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology.

In the system 100 of FIG. 1, the connection across the wireless access network 104 is Internet Protocol (IP)-based, permitting the delivery of Session Initiation Protocol ("SIP") network traffic as well as Hypertext Transfer Protocol ("HTTP") network traffic. The access gateway server 106 is connected to an IP Multimedia Subsystem ("IMS") 108. SIP traffic flows between the access gateway server 106 and one or more Call Session Control Function servers 110, which are located within the IMS 108.

The Call Session Control Function servers 110 are communicatively coupled with a subscriber database 112, which may be utilized during the IMS registration process for registering users and their communication devices with the IMS 108. Registration with the IMS may include verifying the user's identity, recording a device ID for their communication device(s), checking the user's payment history, and other functions. In addition, the subscriber database 112 may keep track of a list of security associations, online applications that the user is allowed to access or that the user is not allowed to access, or rules regarding the use of multiple cellular numbers associated with the cellular device 102.

The system 100 includes a services gateway 114. The services gateway 114 in the IMS 108 verifies a user's registration with the IMS and generates an authorization token for the user. The token is sent to the cellular device 102 using an encrypted Session Initiation Protocol (SIP). When the user wants to access an online application program, a program or browser running on the communication device generates an HTTP or HTTPS request to a services gateway (SG) on the IMS. (Note that where "HTTP" is used herein, the system may also represent secure HTTP communications using encryption or HTTPS).

The services gateway 114 communicates with an application server 116 to provide services of a web server 118 to a user of the cellular device 102. Additional details of the IMS 108, including the Call Session Control Function servers 110, may be found in the U.S. Pat. No. 8,762,559, entitled "System and Method for Non-IMS Application Service Access Over IP Multimedia Subsystem," filed on Dec. 16, 2011, which is herein incorporated by reference in its entirety.

As noted above, some cellular systems provide for the ability of users to receive and send calls on different cellular numbers on a single mobile device, such as the DIGITS service provided by T-MOBILE US, located in Bellevue, Wash. For example, some cellular network providers may provide for the ability of a mobile device, such as the cellular device 102, to register on a cellular network using multiple cellular numbers. A SIM card can be provided that allows the cellular device 102 to support the use of multiple cellular numbers.

For example, a SIM card used in the cellular device 102 can have a native number such as the original cellular number assigned to the cellular device 102 when the user registers with the particular cellular service. The SIM card can also be associated with one or more "virtual numbers." The virtual numbers are associated with the SIM card of the cellular device in the subscriber database 112, so that when a call is made to the cellular device 102, the call can be routed to the cellular device 102. When making or receiving calls, the use of the native number and the one or more virtual numbers can be handled over a cellular voice channel rather than a data channel.

As noted above, the use of multiple cellular numbers can provide various advantages. When a call is received using either a native number or a virtual number, the caller identification information that is displayed on the cellular device 102 may not indicate which line is being used. To provide information regarding which number is being used to connect the cellular device 102, a customizable field 120 of contacts 122 is modified.

During a connection process, the contacts 122 stored in the cellular device 102 is accessed. The originating number of the call is matched to a contact and identification information is displayed on the cellular device 102. The identification information contains various fields. In conventional systems, the identification information is used to provide information about the originating device (i.e. the number of the originating device, the name of the person associated with the originating device, and the like).

In a distinctly different manner, the customizable field 120 is modified to indicate the number the originating device is using to call the cellular device 102, e.g. the native number or one of the virtual numbers. In that manner, when the identification information is displayed on the cellular device 102, one of the pieces of information is a name or identification of the cellular number being used.

For example, the SIM card of the cellular device 102 may have a native number for personal use and a virtual number for business use. In conventional systems, the identification information displayed on the cellular device 102 may only indicate information about the originating device (and user), not the number the originating device is using to call the cellular device 102. Thus, a user using conventional systems may not know which type of cellular number, personal or work, is being used. The customizable field 120 can provide the information, as explained in more device in FIG. 2.

Figure 2:
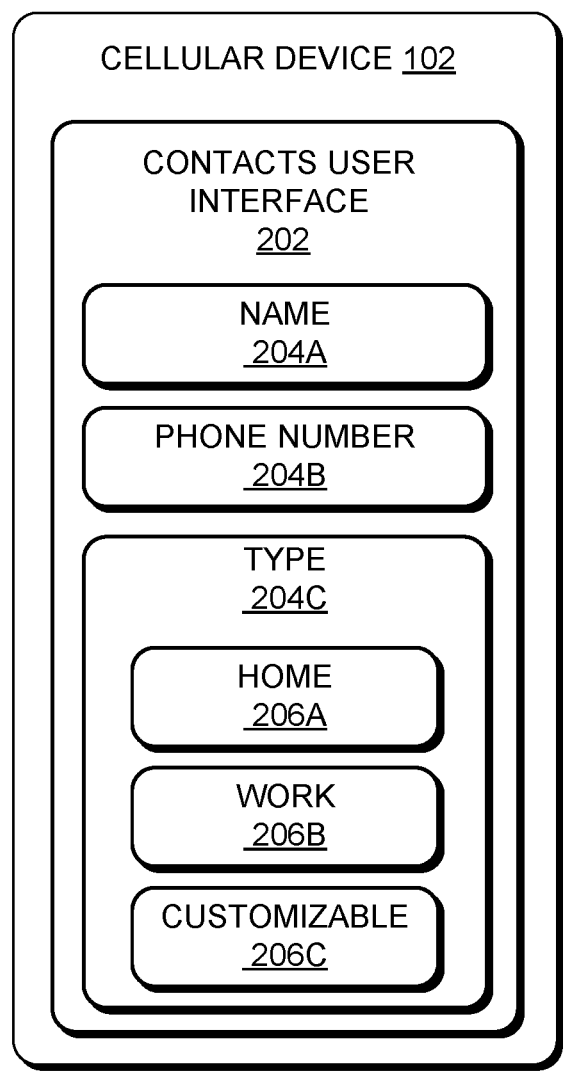
FIG. 2 illustrates a contact user interface for using a customizable field.

FIG. 2 is an illustration of a user interface that may be used to modify the customizable field to identify the cellular number used on a mobile device capable of supporting multiple cellular numbers. Illustrated in FIG. 2 is a contact user interface 202. The contact user interface 202 is an interface rendered in the display of the cellular device 102. The contact user interface 202 has various input fields whereby information about a device can be received. Some of the information entered into the fields are displayed when a contact using a particular device attempts to call the cellular device 102. Some common fields include the name field 204A and the phone number field 204B. The name field 204A is a name associated with a device using the phone number entered into the phone number field 204B.

The contacts user interface 202 also includes a type field 204C. In conventional systems, the type field 204C is typically used to indicate the type of device associated with the phone number entered into the phone number field 204B. Various types include a home device 206A and a work device 206B. Various examples of the presently disclosed subject matter include a customizable field 206C. The customizable field 206C is configured to allow textual input to indicate a customized type.

Using the customizable field 206A, a user can associate the phone number entered into the phone number field 204B with a cellular number used by the cellular device 102. For example, an individual or organization entered into the name field 204A may be work related. The individual or organization may have been provided a number used by the cellular device 102 that is associated with work-related matters. In the customizable field 206C, a user can input into the customizable field 206 the nomenclature "WORK NUMBER," or other nomenclature as desired by the user to indicate a work-related call. If an individual or organization entered into the name field 204A is a personal contact, the individual or organization may have been provided a number used by the cellular device 102 that is associated with personal-related matters. In the customizable field 206C, a user can input into the customizable field 206C the nomenclature "PERSONAL NUMBER," or other nomenclature as desired by the user to indicate a personal call. Thus, when a call originates from the phone number received in the phone number field 204B, the information presented to the user can indicate the type of call received, illustrated in more detail in FIG. 3.

Figure 3:
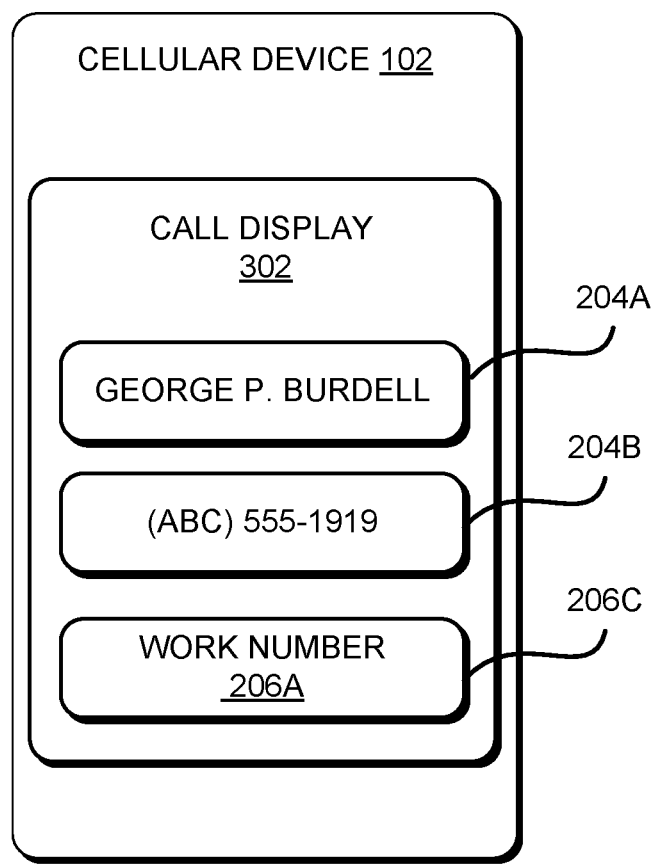
FIG. 3 illustrates a display using the customizable field.

FIG. 3 is an illustration of the cellular device using the customizable field 206C. In FIG. 3, the cellular device 102 has received a connection request from a mobile network to connect the cellular device 102 to an originating device. Upon receipt of the connection request, the cellular device 102 receives an identification of the device attempting to make a connection. The cellular device 102 accesses the contacts 122 and retrieves the appropriate name from the name field 204A, the originating number from the number field 204B.

The cellular device 102 also retrieves the type of call from the customizable field 206C. In the example illustrated in FIG. 3, the type is WORK NUMBER. Thus, when displayed in the call display 302, a user can readily ascertain that the originating device is calling the user on the work number associated with the cellular device. Thus, in this example, instead of being provided information about the originating device, the user is provided information about the intent or use of the call, e.g. in this instance a work-related matter.

Figure 4:
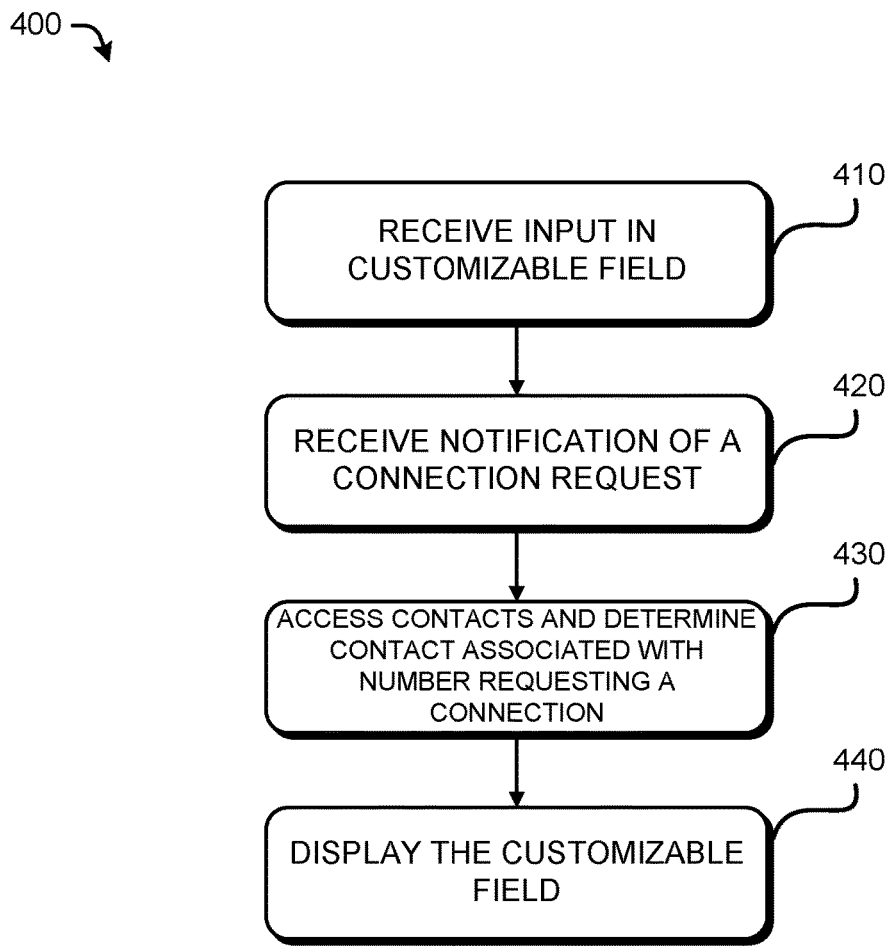
FIG. 4 is an illustrative process for identifying a number used to call a cellular device.

FIG. 4 illustrates an example cellular number identification process 400. The process is illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Referring to FIG. 4, the cellular number identification process 400 commences at operation 410, where an input is received in a customizable field of a contact. As noted above, in some examples, an application for creating or modifying contact information provides the customizable field 206C. The customizable field 206C is associated with a field such as the type field 204C. A user or other entity can input information that indicates the type of line used by the name input in the name field 204A.

In some examples, the input is received from a user using the cellular device 102. In other examples, the input is received from a process or other entity. For example, the user can download a list of contacts to the cellular device 102 to be received at the cellular device 102. The cellular device 102 can analyze the identification of the list of contacts, either through the name of the file or as designated by the user or another entity, and determine that the contacts will use the phone number related to work. When storing and making available the contacts to the user, the cellular device 102 can automatically input an appropriate nomenclature into the customizable field 206C. In some examples, a user can input the appropriate nomenclature.

In other examples, the cellular device 102 may be configured to automatically determine the type of call based on the number received. A user can access a list of cellular numbers available for use on the cellular device 102. The user can name each number, e.g. "Work Related," "Personal Related," and so forth. The name can be used to enter information into the customizable field 206C. For example, a contact may not have been established for an incoming call (e.g. a call from an unknown number).

However, the cellular device 102 will know which number the originating call is using. The cellular device 102 can be configured to generate a temporary contact for the unknown call and insert the cellular number of originating device into a name field (or other field) and the nomenclature received from the user into a customizable field. In that example, even if the name of the originating call is unknown, the customizable field 206C can be used to provide information to the user that the call is originating using a particular type of field.

The cellular number identification process 400 continues at operation 420, where the cellular device 102 receives a notification from the cellular network that a connection request has been generated to establish a cellular communication link between an originating device and the cellular device. The cellular device 102 is capable of receiving and originating calls using multiple numbers. Thus, as part of the connection request, the cellular device 102 will receive information such as the originating call number (if not blocked) and the number used by the originating device to establish a connection with the cellular device 102.

The cellular number identification process 400 continues at operation 430, where the cellular device 102 uses the originating call number (or other information as may be provided by the particular cellular service) and accesses the contacts. An appropriate contact is determined from the contacts and the identification information is presented, including the information from the customizable field indicating which line is being used to connect the call. In some examples, originating call number may be blocked or a contact may not have been generated for an incoming call. In those and other similar instances, the cellular device 102 may generate a temporary contact with the customizable field modified to indicate which line is being used to connect the call.

For example, a cellular device can receive a notification of connection request from an originating device, determine that a contact has not been saved for a number associated with the originating device, generate a temporary contact, in a name field of the temporary contact, insert a number of the originating device; insert into a customizable field of the temporary contact the first cellular number or the second cellular number, and display the name field and the customizable field of the temporary contact. In another example, a cellular device can be used to commence a connection request from the cellular device to a receiving device, determine that a contact has not been saved for a number associated with the cellular number of the receiving device, generate a temporary contact for the receiving device, in a name field of the temporary contact, insert the number of the receiving device, insert into a customizable field of the temporary contact the first cellular number or the second cellular number; and display the name field and the customizable field of the temporary contact.

The cellular number identification process 400 continues at operation 440, where the customizable field, and other information as appropriate, is displayed on the cellular device 102.

It should be noted that a similar process may be used for an outgoing call. For example, when originating a call from the cellular device 102, the information the cellular device 102 displays when the call is placed may be the contact information provided in the customizable field for the contact being called. The process 400 thereafter ends.

Figure 5:
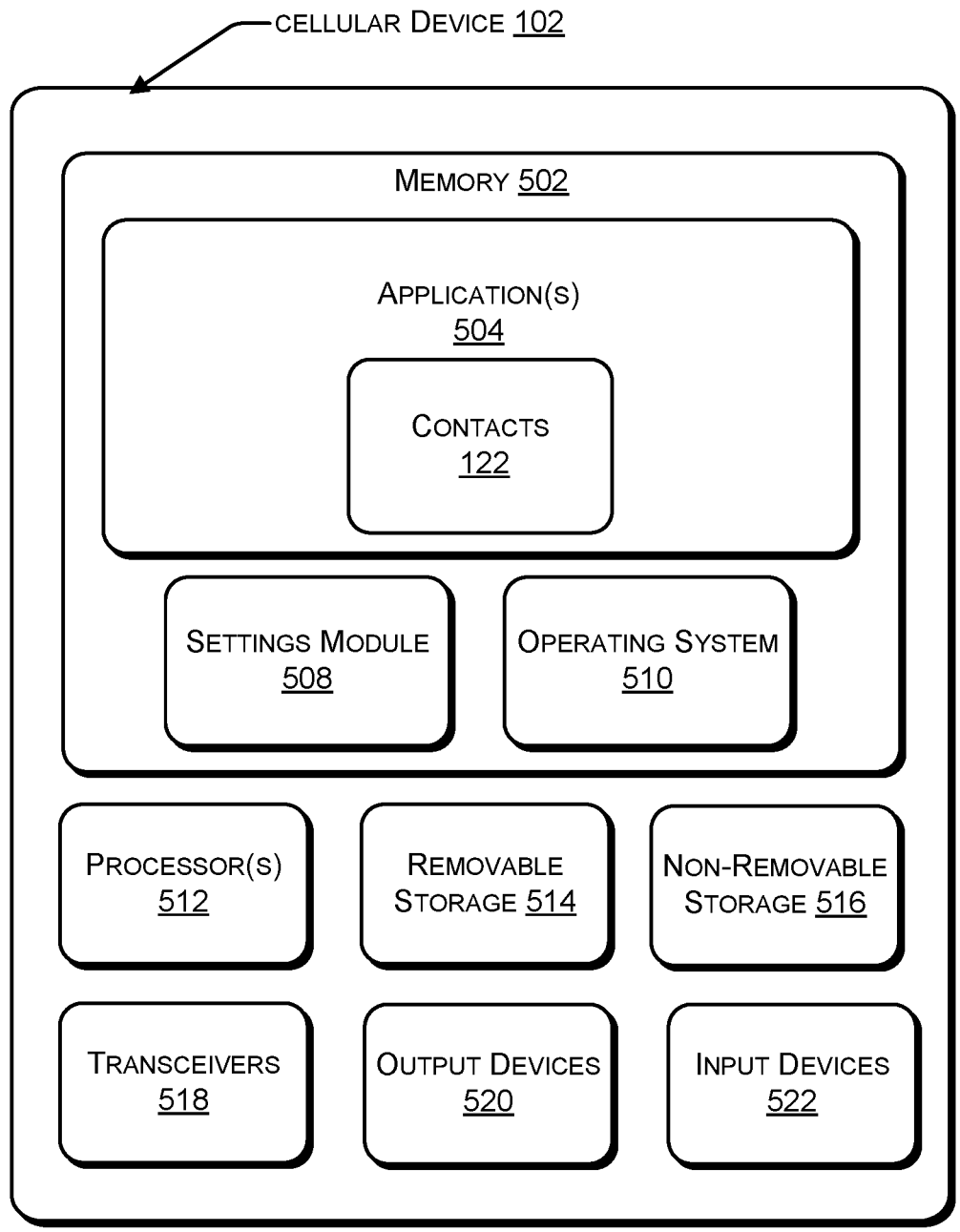
FIG. 5 illustrates a component level view of a cellular device configured to function within a wireless communication network.

FIG. 5 illustrates a component level view of a cellular device 102 configured to function within a wireless communication network that may be used as the user device 102. As illustrated, the cellular device 102 comprises a system memory 502 for storing application(s) 504. The applications 504 can include the contacts 122. The cellular device 102 includes processor(s) 512, a removable storage 514, a non-removable storage 516, transceivers 518, output device(s) 520, and input device(s) 522. In various implementations, system memory 502 is volatile (such as RAM), non-volatile (such as ROM, flash memory, etc.) or some combination of the two. In some implementations, the processor(s) 512 is a central processing unit (CPU), a graphics processing unit (GPU), or both CPU and GPU, or any other sort of processing unit.

The cellular device 102 may also include additional data storage devices (removable and/or non-removable) such as, for example, magnetic disks, optical disks, or tape. Such additional data storage may include removable storage 514 and non-removable storage 516.

Non-transitory computer-readable media may include volatile and nonvolatile, removable and non-removable tangible, physical media implemented in technology for storage of information, such as computer readable instructions, data structures, program modules, or other data. System memory 502, removable storage 514 and non-removable storage 516 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the cellular device 102. Any such non-transitory computer-readable media may be part of the cellular device 102.

The non-transitory computer-readable media can be configured to store computer-executable instructions that, when executed by the processor 512, cause the processor 512 to perform the instructions.

In some implementations, the transceivers 518 include any sort of transceivers known in the art. For example, the transceivers 518 may include a radio transceiver that performs the function of transmitting and receiving radio frequency communications via an antenna. The transceivers 518 may include wireless modem(s) to may facilitate wireless connectivity with other computing devices. Further, the transceivers 518 may include wired communication components, such as an Ethernet port, for communicating with other networked devices.

In some implementations, the output devices 520 include any sort of output devices known in the art, such as a display (e.g., a liquid crystal display), speakers, a vibrating mechanism, or a tactile feedback mechanism. Output devices 520 also include ports for one or more peripheral devices, such as headphones, peripheral speakers, or a peripheral display.

In various implementations, input devices 522 include any sort of input devices known in the art. For example, input devices 522 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 6:
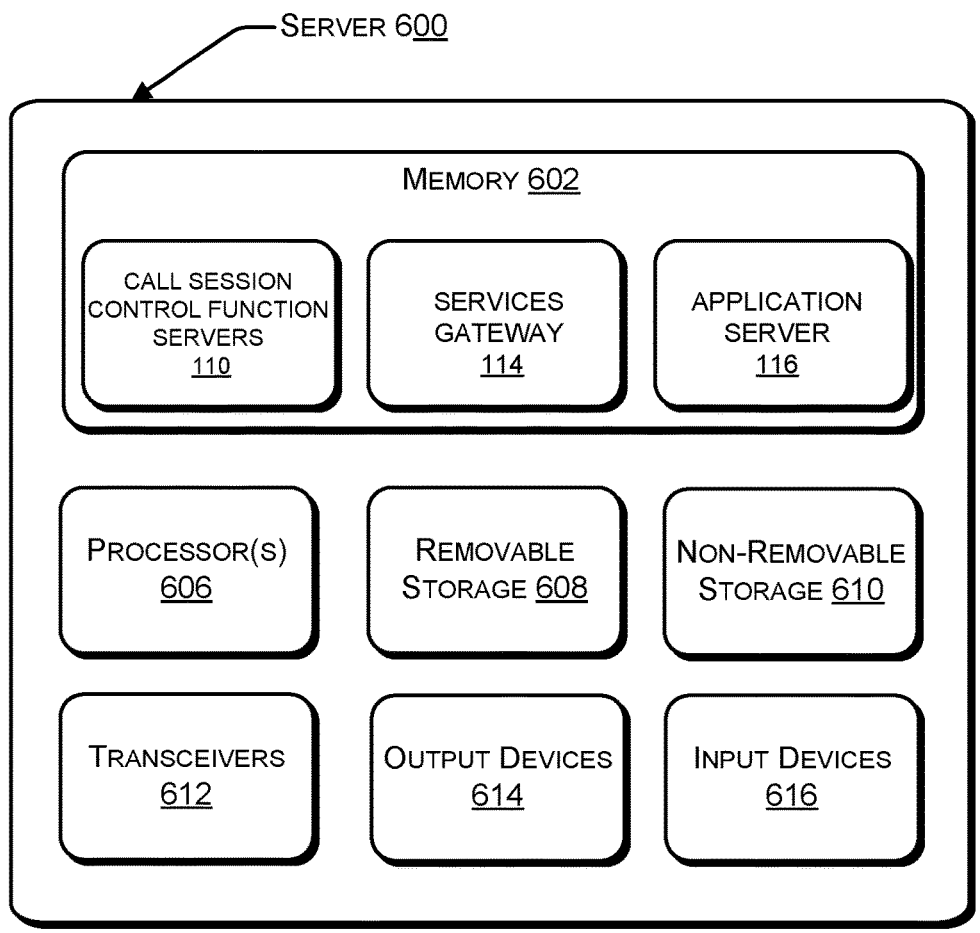
FIG. 6 illustrates a component level view of a server configured for use within a wireless communication network in order to provide various services within the wireless communication network.

FIG. 6 illustrates a component level view of a server 600 configured for use within a wireless communication network in order to provide various services within the wireless communication network, such the application server 116, the Call Session Control Function servers 110 and the services gateway 114. The server 600 may be located in a radio network controller or gateway. Additionally, the server 600 may be a separate entity located separately from the RNC or gateway. As illustrated, the server 600 comprises a system memory 602 storing computer-executable instructions to implement the application server 116, the Call Session Control Function servers 110 and the services gateway 114. The system memory 602 may also store additional applications and programs. Also, the server 600 includes processor(s) 606, a removable storage 608, a non-removable storage 610, transceivers 612, output device(s) 614, and input device(s) 616.

In various implementations, system memory 602 is volatile (such as RAM), non-volatile (such as ROM, flash memory, etc.) or some combination of the two. In some implementations, the processor(s) 606 is a central processing unit (CPU), a graphics processing unit (GPU), or both CPU and GPU, or any other sort of processing unit.

The server 600 may also include additional data storage devices (removable and/or non-removable) such as, for example, magnetic disks, optical disks, or tape. Such additional storage is illustrated in FIG. 6 by removable storage 608 and non-removable storage 610.

Non-transitory computer-readable media may include volatile and nonvolatile, removable and non-removable tangible, physical media implemented in technology for storage of information, such as computer readable instructions, data structures, program modules, or other data. System memory 602, removable storage 608 and non-removable storage 610 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the server 600. Any such non-transitory computer-readable media may be part of the server 600.

In some implementations, the transceivers 612 include any sort of transceivers known in the art. For example, the transceivers 612 may include wired communication components, such as an Ethernet port, for communicating with other networked devices. Also or instead, the transceivers 612 may include wireless modem(s) to may facilitate wireless connectivity with other computing devices. Further, the transceivers 612 may include a radio transceiver that performs the function of transmitting and receiving radio frequency communications via an antenna.

In some implementations, the output devices 614 include any sort of output devices known in the art, such as a display (e.g., a liquid crystal display), speakers, a vibrating mechanism, or a tactile feedback mechanism. Output devices 614 also include ports for one or more peripheral devices, such as headphones, peripheral speakers, or a peripheral display.

In various implementations, input devices 616 include any sort of input devices known in the art. For example, input devices 616 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   on a cellular device capable of using a first cellular number and a second cellular number, receiving an input to open a contacts application to generate a contact, the contact including a name field indicating a name of the contact and a phone number field indicating a phone number of the contact;
   displaying a customizable field in the contact, the customizable field associating a call received from the contact with the first cellular number or with the second cellular number;
   receiving an input to modify the customizable field, the input identifying the first cellular number or the second cellular number;
   storing the input as part of the contact;
   receiving an incoming call from the contact; and
   displaying on the cellular device in response to receiving the incoming call from the contact, the name field, phone number field, and the customizable field of the contact.

2. The method of claim 1, wherein the first cellular number is a native number and the second cellular number is a virtual number.

3. The method of claim 1, further comprising:
   receiving a notification of a connection request from an originating device; and
   displaying the customizable field to indicate that the connection request is being handled using the first cellular number or the second cellular number.

4. The method of claim 1, further comprising:
   receiving an input to originate a call at the cellular device;
   accessing a plurality of contacts to determine a contact associated with a number for the call;
   accessing the customizable field of the contact; and
   displaying the customizable field to indicate that the call is being handled using the first cellular number or the second cellular number.

5. The method of claim 1, further comprising:
   receiving a notification of a connection request from an originating device;
   determining that a contact has not been saved for a number associated with the originating device;
   generating a temporary contact;
   in a name field of the temporary contact, inserting a number of the originating device;
   inserting into a customizable field of the temporary contact the first cellular number or the second cellular number; and
   displaying the name field and the customizable field of the temporary contact.

6. The method of claim 1, wherein the first cellular number and the second cellular number are handled over a voice channel.

7. The method of claim 1, further comprising:
   receiving a list of contacts;
   analyzing the list of contacts;
   determining, as a determination, which of the first cellular number or the second cellular number each of the contacts of the list of contacts will use; and
   inputting, into the customizable field for each of the contacts of the list of contacts, the first cellular number or the second cellular number based on the determination as to which of the first cellular number or the second cellular number each of the contacts of the list of contacts will use.

8. A non-transitory computer-readable storage medium having computer-executable instructions stored thereupon that, when executed by a processor of a cellular device, cause the cellular device to:
   receive a notification of a connection request on the cellular device from an originating device, the cellular device capable of using a first cellular number and a second cellular number;
   access a plurality of contacts to determine a contact associated with the originating device, one of the plurality of contacts including a name field, a phone number field, and a customizable field;
   access the name field, the phone number field, and the customizable field of the one of the plurality of contacts associated with the originating device, the customizable field identifying a number used by the originating device to establish a call with the cellular device; and
   display the name field, the phone number field, and the customizable field.

9. The non-transitory computer-readable storage medium of claim 8, wherein the first cellular number is a native number and the second cellular number is a virtual number.

10. The non-transitory computer-readable storage medium of claim 8, wherein the computer-executable instructions stored in the non-transitory computer-readable storage medium further cause the cellular device to:
    display the customizable field to indicate that the connection request is being handled using the first cellular number or the second cellular number.

11. The non-transitory computer-readable storage medium of claim 8, wherein the computer-executable instructions stored in the non-transitory computer-readable storage medium further cause the cellular device to display the customizable field to indicate that the call is being handled using the first cellular number or the second cellular number.

12. The non-transitory computer-readable storage medium of claim 8, wherein the computer-executable instructions stored in the non-transitory computer-readable storage medium further cause the cellular device to:
receive a notification of connection request from an originating device;
determine that a contact has not been saved for a number associated with the originating device;
generate a temporary contact;
in a name field of the temporary contact, insert a number of the originating device;
insert into a customizable field of the temporary contact the first cellular number or the second cellular number; and
display the name field and the customizable field of the temporary contact.

13. The non-transitory computer-readable storage medium of claim 8, wherein the first cellular number and the second cellular number are handled over a voice channel.

14. The non-transitory computer-readable storage medium of claim 8, wherein the computer-executable instructions stored in the non-transitory computer-readable storage medium further cause the cellular device to:
receive a list of contacts;
analyze the list of contacts;
determine, as a determination, which of the first cellular number or the second cellular number each of the contacts of the list of contacts will use; and
input, into the customizable field for each of the contacts of the list of contacts, the first cellular number or the second cellular number based on the determination as to which of the first cellular number or the second cellular number each of the contacts of the list of contacts will use.

15. A cellular device capable of using a first cellular number and a second cellular number, the cellular device comprising:
a non-transitory storage medium; and
instructions stored in the non-transitory storage medium, the instructions being executable by the cellular device to:
receive an input to open a contacts application to generate a contact, the contact including a name field indicating a name of the contact, a phone number field indicating a phone number of the contact, and a customizable field identifying a number used by an originating device to establish a connection with the cellular device;
display a customizable field in the contact;
receive an input to modify the customizable field, the input identifying the first cellular number or the second cellular number;
store the input as part of the contact;
establish a connection with the originating device from the contact; and
display in response to establishing the connection with the originating device from the contact, the name field, the phone number field, and the customizable field of the contact.

16. The cellular device of claim 15, wherein the instructions stored in the non-transitory storage medium further cause the cellular device to:
receive a notification of a connection request from an originating device; and
display the customizable field to indicate that the connection request is being handled using the first cellular number or the second cellular number.

17. The cellular device of claim 15, wherein the instructions stored in the non-transitory storage medium further cause the cellular device to:
receive an input to originate a call at the cellular device;
access a plurality of contacts to determine a contact associated with a number for the call;
access the customizable field of the contact; and
display the customizable field to indicate that the call is being handled using the first cellular number or the second cellular number.

18. The cellular device of claim 15, wherein the instructions stored in the non-transitory storage medium further cause the cellular device to:
receive a notification of a connection request from an originating device;
determine that a contact has not been saved for a number associated with the originating device;
generate a temporary contact;
in a name field of the temporary contact, insert a number of the originating device;
insert into a customizable field of the temporary contact the first cellular number or the second cellular number; and
display the name field and the customizable field of the temporary contact.

19. The cellular device of claim 15, wherein the first cellular number and the second cellular number are handled over a voice channel.

20. The cellular device of claim 15, wherein the instructions stored in the non-transitory storage medium further cause the cellular device to:
receive a list of contacts;
analyze the list of contacts;
determine, as a determination, which of the first cellular number or the second cellular number each of the contacts of the list of contacts will use; and
input, into the customizable field for each of the contacts of the contact list of contacts, the first cellular number or the second cellular number based on the determination as to which of the first cellular number or the second cellular number each of the contacts of the list of contacts will use.

* * * * *